(12) United States Patent
Park et al.

(10) Patent No.: US 11,239,472 B2
(45) Date of Patent: Feb. 1, 2022

(54) METHOD OF MANUFACTURING ELECTROLYTE MEMBRANE FOR FUEL CELL AND ELECTROLYTE MEMBRANE MANUFACTURED THEREBY

(71) Applicants: Hyundai Motor Company, Seoul (KR); Kia Motors Corporation, Seoul (KR)

(72) Inventors: Inyu Park, Seoul (KR); Jae Jun Ko, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 149 days.

(21) Appl. No.: 16/597,500

(22) Filed: Oct. 9, 2019

(65) Prior Publication Data

US 2020/0321625 A1 Oct. 8, 2020

(30) Foreign Application Priority Data

Apr. 3, 2019 (KR) .................. 10-2019-0038781

(51) Int. Cl.
*H01M 8/1053* (2016.01)
*H01M 4/88* (2006.01)
*H01M 8/126* (2016.01)

(52) U.S. Cl.
CPC ....... *H01M 4/8892* (2013.01); *H01M 8/1053* (2013.01); *H01M 8/126* (2013.01); *H01M 2300/0082* (2013.01); *H01M 2300/0094* (2013.01)

(58) Field of Classification Search
CPC . H01M 2300/0082; H01M 2300/0094; H01M 4/8892; H01M 8/1053; H01M 8/1081; H01M 8/126; Y02E 60/50
See application file for complete search history.

(56) References Cited

U.S. PATENT DOCUMENTS

| 8,399,145 B2 | 3/2013 | Barnwell et al. |
| 2009/0110967 A1* | 4/2009 | Hommura ............. C08J 5/2237 429/490 |

FOREIGN PATENT DOCUMENTS

| JP | 2010-135130 A | 6/2010 |
| JP | 6049238 B2 | 12/2016 |
| KR | 101256254 B1 | 4/2013 |
| KR | 10-2018-0078061 A | 7/2018 |

* cited by examiner

*Primary Examiner* — Victoria H Lynch
(74) *Attorney, Agent, or Firm* — Mintz Levin Cohn Ferris Glovsky and Popeo, P.C.; Peter F. Corless

(57) ABSTRACT

Disclosed is a method of manufacturing an electrolyte membrane including an antioxidant. The method may include forming a first dispersion liquid including deionized water, a first ionomer dispersion solution and an antioxidant, and forming a second dispersion liquid including the first dispersion liquid and a second ionomer dispersion solution.

18 Claims, 3 Drawing Sheets

METHOD OF MANUFACTURING ELECTROLYTE MEMBRANE FOR FUEL CELL AND ELECTROLYTE MEMBRANE MANUFACTURED THEREBY

CROSS REFERENCE TO RELATED APPLICATION

The present application claims priority to Korean Patent Application No. 10-2019-0038781, filed Apr. 3, 2019, the entire content of which is incorporated herein for all purposes by this reference.

TECHNICAL FIELD

The present invention relates to a method of manufacturing an electrolyte membrane for a fuel cell and an electrolyte membrane manufactured thereby.

BACKGROUND

A polymer electrolyte membrane fuel cell (PEMFC) is typically configured to include a membrane electrode assembly (MEA), comprising electrodes including an anode and a cathode and an ionomer-based electrolyte membrane, to thereby generate power.

In particular, in order to increase chemical durability, an antioxidant in a salt or oxide form has been added in a predetermined amount to an ionomer dispersion liquid, thus forming a polymer electrolyte membrane. For effective oxidation prevention, an antioxidant containing cerium (Ce) may be included in an electrolyte membrane. Such an antioxidant may be directly added to the ionomer solution, or may be added to a solvent such as water and then mixed.

Cerium ions mixed in salt form through conventional methods are able to very easily move to different positions in the electrolyte membrane in a fuel cell operating environment, or to migrate to an electrode (anode or cathode). Hence, the concentration of cerium that is added to the electrolyte membrane may change. Accordingly, the development of electrolyte membranes including an antioxidant in oxide form has been actively underway these days. For example, a polymer electrolyte membrane has been manufactured by dispersing an antioxidant in an ionomer solution and then performing casting or bar coating. However, since the pH of the ionomer solution is in the acidic range of about 3 to 4, during the dispersion of the antioxidant, the added antioxidant may react with the ionomer solution in an acidic atmosphere and may thus be dissolved (or released). Therefore, the antioxidant is present in an easily movable form, and may be dissolved during the operation of a fuel cell, which is undesirable.

SUMMARY OF THE INVENTION

In preferred aspects, provided is a method of manufacturing an electrolyte membrane, in which the dissolution of an antioxidant may be inhibited during dispersion of the antioxidant in an acidic ionomer solution or during stirring, thereby increasing the acid resistance of the electrolyte membrane.

Further provided is a method of manufacturing an electrolyte membrane, in which an antioxidant dispersion liquid having high dispersibility may be formed, thereby inhibiting the dissolution of the antioxidant and uniformly distributing the antioxidant without agglomeration of particles in the electrolyte membrane.

Also provided is a method of manufacturing an electrolyte membrane, in which the time required to form an ionomer dispersion liquid including an antioxidant may be effectively reduced, thereby shortening the processing time for manufacturing an electrolyte membrane and improving processing efficiency.

The objectives of the present invention are not limited to the foregoing, and other specific details of the present invention are contained in the detailed description and drawings.

In one aspect, provided is a method of manufacturing an electrolyte membrane for a fuel cell, which may include: forming a first dispersion liquid that is an aqueous composition comprising a first ionomer dispersion solution and an antioxidant; and forming a second dispersion liquid including the first dispersion liquid and a second ionomer dispersion solution. The first dispersion liquid may further include deionized water, or may be a water composition or aqueous composition.

Preferably, the forming the first dispersion liquid may include a first dispersing the deionized water, the first ionomer dispersion solution and the antioxidant. For example, the forming the first dispersion liquid may include at least one of a stirring process using a magnetic bar and a sonication process. Deionized water is preferably used to provide an aqueous composition. In certain preferred embodiments, at least a portion of the total water present in the first dispersion liquid is deionized water, e.g., where at least about 10, 20, 30, 40, 50, 60, 70, 80, 90 or 95% of the water present in the first dispersion liquid is deionized water.

The first dispersing may suitably be performed for about 1 min to 60 min.

Preferably, the forming the second dispersion liquid may include a second dispersing. The second dispersing may suitably be performed for about 1 min to 10 min. For example, the second dispersing may be performed through stirring after adding the first dispersion liquid to the second ionomer dispersion solution.

Preferably, a time for performing the second dispersing may be less than a time for the first dispersing.

A composition of the first ionomer dispersion solution may be the same or different from a composition of the second ionomer dispersion solution. Preferably, a composition of the first ionomer dispersion solution is the same as a composition of the second ionomer dispersion solution. For instance, the statement that the same composition of the first ionomer dispersion solution to the composition of the second ionomer dispersion solution is meant that type or composition of the components in the first ionomer dispersion solution is the type or composition of the components in the composition of the second ionomer dispersion solution, which may not be limited the contents (e.g., mixing ratio) of respective components. Preferably, in the second dispersion liquid, a weight of the second ionomer dispersion solution may be greater than a weight of the first ionomer dispersion solution.

Preferably, a mixing ratio of the components in the composition of the first ionomer dispersion solution may be the same as a mixing ratio of the components in the composition of the second ionomer dispersion solution.

A weight ratio of the first ionomer dispersion solution and the second ionomer dispersion solution in the second dispersion liquid may suitably range from about 1:5 to 1:5000.

The antioxidant may suitably include one or more selected from the group consisting of cerium nitrate hexahydrate (Ce(NO$_3$)$_3$.6H$_2$O), cerium oxide (CeO$_2$), and samarium-doped ceria (SDC). However, the present invention is not limited thereto, and any antioxidant may be used so long as it is in the form of an oxidation-proof oxide.

At least one of the first ionomer dispersion solution and the second ionomer dispersion solution may suitably include a solvent component which may include deionized water, n-propyl alcohol of combinations thereof.

At least one of the first ionomer dispersion solution and the second ionomer dispersion solution may suitably include a perfluorinated sulfonic acid ionomer.

The equivalent weight (EW) of at least one of the first ionomer dispersion solution and the second ionomer dispersion solution may suitably range from about 700 to about 1200.

The method of the present invention may further include, after the forming the second dispersion liquid; manufacturing an electrolyte membrane by coating a release film with the second dispersion liquid; and thermally treating the electrolyte membrane.

Further provided is an electrolyte membrane for a fuel cell, manufactured by the method described herein.

Other aspects of the invention are disclosed infra.

According to various exemplary embodiments of the present invention, a method of manufacturing an electrolyte membrane for a fuel cell may include a dual dispersion process using an ionomer dispersion solution in a stepwise manner, thereby increasing the acid resistance of an antioxidant included in the electrolyte membrane, ultimately improving the durability of a fuel cell.

Also, an electrolyte membrane manufactured through such a dual dispersion process may be configured such that the antioxidant included in the electrolyte membrane maybe uniformly and homogenously distributed without agglomeration of particles. Thus, the performance of a fuel cell including the electrolyte membrane may be further improved.

Also, the stirring time for dispersion of the antioxidant during the process of manufacturing the electrolyte membrane may be minimized, thereby reducing the overall processing time for manufacturing an electrolyte membrane having improved performance and increasing productivity.

The effects of the present invention are not limited to the foregoing, and should be understood to include all effects that can be reasonably anticipated from the following description.

DESCRIPTION OF SPECIFIC EMBODIMENTS

Figure 1:
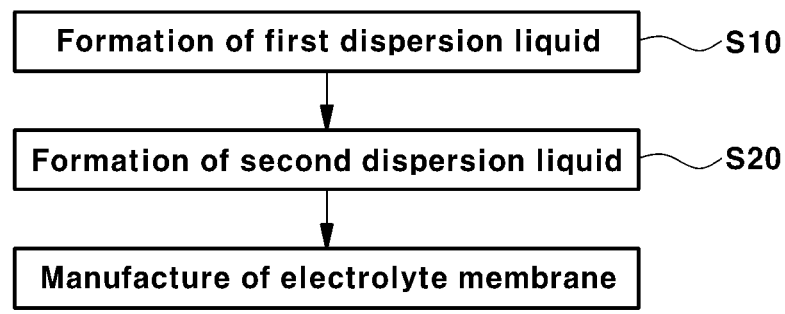
FIG. 1 shows an exemplary process of manufacturing an electrolyte membrane for a fuel cell according to an exemplary embodiment of the present invention.

Hereinafter, exemplary embodiments of the present invention will be described in detail with reference to the accompanying drawings. The advantages and features of the present invention, as well as how to accomplish them, will become apparent with reference to the exemplary embodiments described in detail below with reference to the accompanying drawings. However, the present invention is not limited to the embodiments disclosed below, but may be embodied in various forms. These embodiments are provided so that this disclosure will be thorough and complete and will fully convey the concept of the invention to those skilled in the art to which the present invention belongs, and the present invention is only defined by the scope of the claims. Throughout the drawings, the same reference numerals will refer to the same or like elements.

Unless defined otherwise, all terms (including technical and scientific terms) used herein may be used in a sense that is commonly understood by those skilled in the art to which the present invention to belongs. Also, commonly used predefined terms are not to be ideally or excessively formally interpreted unless explicitly defined otherwise.

Furthermore, the terminology used herein is for the purpose of illustrating embodiments and is not intended to limit the present invention. In this specification, singular forms, "a," "an" and "the", include plural forms unless the context clearly dictates otherwise. It will be further understood that the terms "comprise", "include", "have", etc., when used in this specification, specify the presence of stated elements, features, numbers, steps, and/or operations, but do not preclude the presence or addition of one or more other elements, features, numbers, steps, and/or operations. Here, the term "and/or" includes each of the mentioned items and all combinations of one or more thereof.

Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, a detailed description will be given of the present invention with reference to the appended drawings.

FIG. 1 is a flowchart showing an exemplary process of manufacturing an exemplary electrolyte membrane for an exemplary fuel cell according to an exemplary embodiment of the present invention. As shown in FIG. 1, the method of manufacturing an exemplary electrolyte membrane including an exemplary antioxidant may include forming a first dispersion liquid including water or a water composition such as deionized water as disclosed above, a first ionomer dispersion solution and an antioxidant, for example, by mixing and dispersing thereof (S10) and forming a second dispersion liquid including the first dispersion liquid and a second ionomer dispersion solution, for example, by adding the first dispersion liquid to the second ionomer dispersion solution and dispersing (S20).

Particularly, in the method of manufacturing the electrolyte membrane for a fuel cell according to an exemplary embodiment of the present invention, in order to increase the dispersibility of the antioxidant and inhibit dissolution thereof in an acidic solution or increase acid resistance, a dual dispersion process (S10 and S20) using the ionomer dispersion solution in a stepwise manner may be included. Through the dual dispersion process, the antioxidant may be uniformly and homogeneously distributed without agglomeration of particles in the final electrolyte membrane. Moreover, the stirring time for dispersion of the antioxidant through the dual dispersion process may be minimized, and thus the overall processing time required to manufacture the electrolyte membrane may be reduced, thereby improving productivity.

Figure 2:
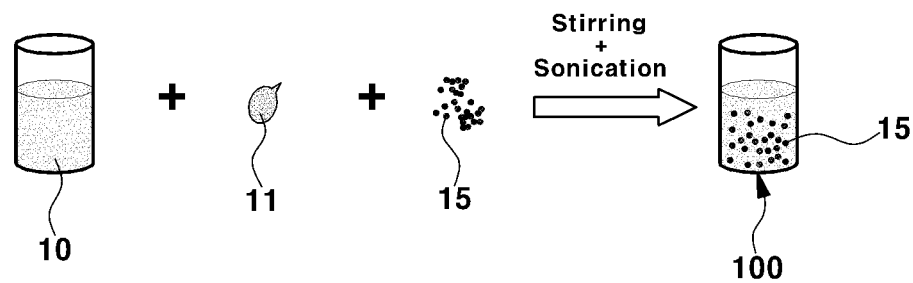
FIG. 2 shows formation of an exemplary first dispersion liquid in an exemplary embodiment of the present invention.
Figure 3:
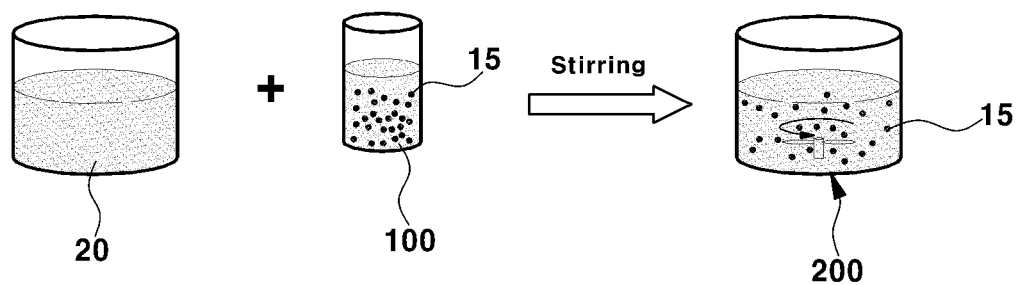
FIG. 3 shows formation of an exemplary second dispersion liquid in an exemplary embodiment of the present invention.

Subsequently, individual dispersion processes (S10 and S20) are exemplified in FIGS. 2 and 3. FIG. 2 shows the formation of the first dispersion liquid (S10 of FIG. 1) in an exemplary embodiment of the present invention, and FIG. 3 shows the formation of the second dispersion liquid (S20 of FIG. 1) in an exemplary embodiment of the present invention.

As shown in FIG. 2, the formation of the first dispersion liquid (S10) may be performed in a manner in which, for example, water composition such as deionized water 10, a first ionomer dispersion solution 11 and an antioxidant 15 may be mixed and the resultant mixed solution may be dispersed, thereby obtaining a first dispersion liquid 100.

In particular, in order to uniformly disperse the antioxidant 15, a stirring process may be performed for a sufficient period of time, whereby the antioxidant 15 may be dispersed in the first ionomer dispersion solution 11. For example, the formation of the first dispersion liquid 100 may be performed for 1 min to 60 min. Thereby, the first dispersion liquid 100 in which the antioxidant 15 may be uniformly dispersed (i.e. dispersibility is improved) may be formed. As such, the dispersion process may include at least one of, for example, a stirring process using magnetic bars and a sonication process.

In the formation of the first dispersion liquid (S10), the antioxidant 15 preferably may contain cerium (Ce). The antioxidant 15 may include one or more selected from the group consisting of, for example, cerium nitrate hexahydrate $(Ce(NO_3)_3 \cdot 6H_2O)$, cerium oxide $(CeO_2)$, and samarium-doped ceria (SDC). However, the present invention is not limited thereto, and any antioxidant may be used so long as it is in the form of an oxidation-proof oxide.

In the formation of the first dispersion liquid (S10), the first ionomer dispersion solution 11 may include a solvent component including, for example, deionized water, n-propyl alcohol or combinations thereof. Also, the first ionomer dispersion solution 11 may include, for example, a perfluorinated sulfonic acid ionomer. Particularly, the antioxidant 15 in oxide form may be added to a perfluorinated sulfonic acid ionomer dispersion solution as the first ionomer dispersion solution 11, and may then be stirred using magnetic bars in order to realize uniform distribution (S10).

In the formation of the first dispersion liquid (S10), the equivalent weight (EW) of the first ionomer dispersion solution 11 may range from about 700 to about 1200.

Subsequently, as shown in FIG. 3, the formation of the second dispersion liquid (S20) may be performed in a manner in which, for example, the first dispersion liquid 100 may be added to a second ionomer dispersion solution 20 and then dispersed, thereby obtaining a second dispersion liquid 200.

In particular, the formation of the second dispersion liquid (S20) may be conducted for, for example, about 1 min to 10 min. Furthermore, the time for the dispersing during the formation of the second dispersion liquid 200 (S20) may be shorter than the time for the dispersing during the formation of the first dispersion liquid 100 (S10), but the present invention is not limited thereto.

The dispersion time during the formation of the second dispersion liquid 200 (S20) is the period of time required to disperse the first dispersion liquid 100 that has been added to the second ionomer dispersion solution 20. Also, the time for the dispersing during the formation of the first dispersion liquid 100 (S10) may be the period of time required to disperse deionized water 10, the first ionomer dispersion solution 11, and the antioxidant 15.

The dispersion during the formation of the second dispersion liquid 200 (S20) may be carried out through stirring after adding the first dispersion liquid 100 to the second ionomer dispersion solution 20. Particularly, the dispersion process may include stirring using magnetic bars.

In the formation of the second dispersion liquid (S20), the second ionomer dispersion solution 20 may include a solvent component including, for example, deionized water, n-propyl alcohol or combinations thereof. The second ionomer dispersion solution 20 may also include a perfluorinated sulfonic acid ionomer. The EW of the second ionomer dispersion solution 20 may range from about 700 to about 1200.

In the method of manufacturing the electrolyte membrane for a fuel cell according to an exemplary embodiment of the present invention, the composition included in the first ionomer dispersion solution (11 of FIG. 2) during the formation of the first dispersion liquid (S10) may be the same as the composition included in the second ionomer dispersion solution (20 of FIG. 3) during the formation of the second dispersion liquid (S20). Here, in the second dispersion liquid, the weight of the second ionomer dispersion solution 20 may be greater than that of the first ionomer dispersion solution 11.

Also, the mixing ratio of the components in the composition of the first ionomer dispersion solution 11 may be the same as the mixing ratio of the components in the composition of the second ionomer dispersion solution 20. For example, the first ionomer dispersion solution 11 and the second ionomer dispersion solution 20 may have the same composition (e.g. the same ionomer and the same solvent) and the same mixing ratio, but the present invention is not limited thereto.

In the method of manufacturing the electrolyte membrane for a fuel cell according to an exemplary embodiment of the present invention, the weight of the second ionomer dispersion solution 20 may be greater than the weight of the first ionomer dispersion solution 11, and particularly, for example, in the second dispersion liquid, the weight ratio of the first ionomer dispersion solution 11 to the second ionomer dispersion solution 20 may range from about 1:5 to about 1:5000. In particular, when the first ionomer dispersion solution 11 and the second ionomer dispersion solution 20 have the same composition and the mixing ratio, the weight ratio of the first ionomer dispersion solution 11 during the formation of the first dispersion liquid (S10) and the second ionomer dispersion solution 20 during the formation of the second dispersion liquid (S20) preferably may be in the range of about 1:5 to 1:5000, or particularly of about 1:10 to 1:3000. Thereby, an electrolyte membrane for a fuel cell, capable of inhibiting the dissolution of the antioxidant 15, may be manufactured.

Figure 4:
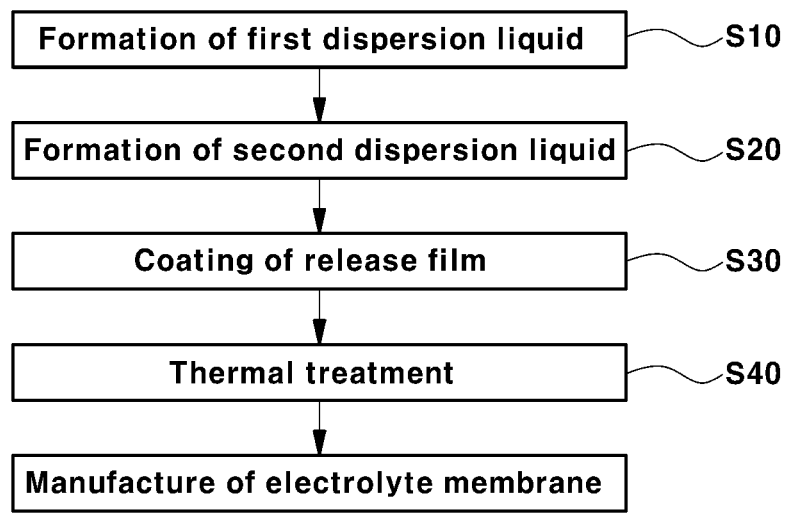
FIG. 4 shows an exemplary process of manufacturing an exemplary electrolyte membrane for an exemplary fuel cell according to an exemplary embodiment of the present invention.
Figure 5:
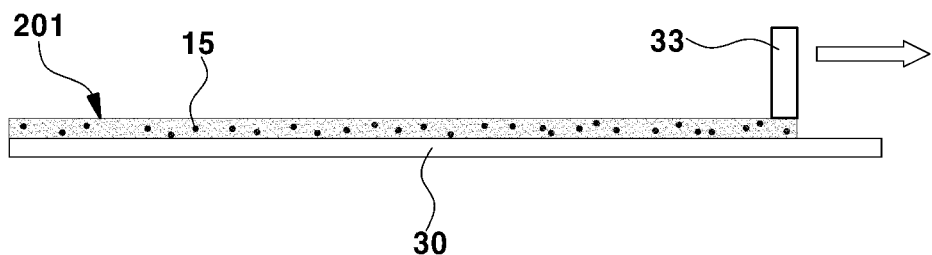
FIG. 5 shows an exemplary electrolyte membrane applied on a release film in an exemplary embodiment of the present invention.

As shown in FIGS. 4 and 5, a method of manufacturing an exemplary electrolyte membrane for an exemplary fuel cell according to an exemplary embodiment of the present invention is described below. FIG. 4 is a flowchart showing the process of manufacturing an exemplary electrolyte membrane according to an exemplary embodiment of the present invention, and FIG. 5 is a concept view showing the electrolyte membrane applied on a release film. For the sake of ease of description, only content different from the description pertaining to FIGS. 1 to 3 is described.

As shown in FIG. 4, the method of manufacturing an exemplary electrolyte membrane for a fuel cell according to an exemplary embodiment of the present invention may further comprise coating a release film with the second dispersion liquid (S30) after the formation of the second dispersion liquid (S20). For example, the second dispersion liquid, in which the antioxidant is dispersed in the ionomer solution through stirring for a sufficient period of time in order to realize uniform dispersion, may be subjected to casting or bar coating, thereby obtaining a polymer electrolyte membrane.

Also, the method of manufacturing the electrolyte membrane may further comprise thermally treating the electrolyte membrane (S40). Here, the thermal treatment may be performed in an oven at a temperature of about 100° C. to 250° C. for about 5 min, but the present invention is not limited thereto.

As shown in FIG. 5, after the coating process (S30 of FIG. 4), an electrolyte membrane 201 applied on the release film 30 may be formed. The electrolyte membrane 201 may be formed with a flat surface by passing the surface thereof opposite the surface in contact with the release film 30 through an applicator 33, as shown in FIG. 5.

The electrolyte membrane 201 may be formed from the aforementioned second dispersion liquid (200 of FIG. 3), and thus the electrolyte membrane 201 may include the antioxidant 15. Meanwhile, the electrolyte membrane 201 may also be manufactured by further performing an additional process (e.g. drying). For example, the electrolyte membrane 201 may be formed by additionally conducting the thermal treatment process (S40) after the coating process (S30).

An electrolyte membrane, for example, as manufactured by the method of manufacturing the electrolyte membrane for a fuel cell as described above, may be increased in acid resistance and dispersibility of the contained antioxidant through a dual dispersion process using the ionomer dispersion solution in a stepwise manner. Consequently, the electrolyte membrane may exhibit further increased durability and performance, thereby improving the driving efficiency of a fuel cell and output performance thereof.

Example

A better understanding of the present invention will be given through the following examples and comparative examples. However, the following examples are set forth to illustrate, but are not to be construed as limiting the scope of, the present invention.

Preparation Examples

Preparation Example a) Deionized water was mixed with a small amount of ionomer dispersion solution (a first ionomer dispersion solution), to which samarium-doped ceria (SDC), serving as an antioxidant, was then added, followed by stirring and sonication (primary dispersion), thereby preparing a first dispersion liquid including the antioxidant having improved dispersibility. Here, the mixing ratio of the deionized water, the ionomer dispersion solution and the antioxidant was 1:0.04:0.015 by weight, and the stirring and sonication were performed for 10 min. In the present invention, the small amount of ionomer solution mixed upon primary dispersion of the antioxidant used an ionomer dispersion liquid that was the same as the ionomer solution for manufacturing the electrolyte membrane. Here, the weight ratio of the mixing materials in the ionomer dispersion liquid was deionized water:n-propyl alcohol:ionomer=1:0.835:0.459.

b) Next, a second dispersion liquid in which the antioxidant was uniformly dispersed in a perfluorinated sulfonic acid ionomer dispersion solution (a second ionomer dispersion solution) was prepared (secondary dispersion). Here, the dispersion time was 2 min. The first dispersion liquid including the antioxidant prepared through primary dispersion was mixed with a large amount of the ionomer dispersion liquid and then stirred for about 2 min to give an ionomer dispersion liquid including the antioxidant, and the first dispersion liquid including the antioxidant and the ionomer dispersion liquid were mixed at a weight ratio of 1:15. The second ionomer dispersion solution had the same composition and mixing ratio as in the first ionomer dispersion solution in step a).

c) The solution obtained in step b) was applied on a release film, thereby manufacturing a polymer electrolyte membrane including the antioxidant. Particularly, a polymer electrolyte membrane was manufactured through a bar-coating process using the ionomer dispersion liquid including the antioxidant. Furthermore, final thermal treatment was performed in an oven at a temperature of 170° C. for about 5 min.

Comparative Preparation Example

A polymer electrolyte membrane was manufactured in a manner in which a dispersion liquid obtained by mixing an antioxidant with deionized water was added to an ionomer dispersion solution and was then dispersed through stirring, without the addition of the small amount of ionomer dispersion solution in step a) (formation of the first dispersion liquid) of Preparation Example. Here, the dispersion was performed for 120 min.

In the antioxidant dispersion liquid of Comparative Preparation Example, the deionized water, the ionomer dispersion solution and the antioxidant were mixed at a weight ratio of 1:0:0.015, and stirring and sonication were performed for 10 min. The small amount of ionomer dispersion solution mixed upon primary dispersion of the antioxidant in Preparation Example was the same solution as the ionomer dispersion solution used in a large amount for manufacturing an electrolyte membrane. Here, the mixing ratio of deionized water, n-propyl alcohol, and the ionomer was 1:0.835:0.459 by weight.

The antioxidant dispersion liquid prepared through primary dispersion was mixed with the ionomer dispersion solution at a weight ratio of 1:15 and was then stirred for about 120 min, thereby preparing an ionomer dispersion solution including the antioxidant, from which a polymer electrolyte membrane was then manufactured through a bar-coating process. Moreover, final thermal treatment was performed in an oven at 170° C. for about 5 min.

Test Examples

TABLE 1

| No. | Sample name | Thermal treatment temp. (° C.) | Primary dispersion (addition of ionomer) | Secondary dispersion time (min) |
| --- | --- | --- | --- | --- |
| Comparative Example 1 | SDC-600 | 600 | X | 120 |
| Comparative Example 2 | SDC-800 | 800 | X | 120 |
| Example 1 | SDC-600 | 600 | ○ | 2 |
| Example 2 | SDC-800 | 800 | ○ | 2 |

Examples 1 and 2

The electrolyte membranes of Examples 1 and 2 were manufactured through a dual dispersion process (including steps a) and b) in Preparation Example), and Table 1 shows the primary dispersion (performed or not) and the secondary dispersion time (2 min). In Example 1, the SDC antioxidant (SDC-600) thermally treated at a temperature of 600° C. was added and used in the process of manufacturing the electrolyte membrane. In Example 2, the SDC antioxidant (SDC-800) thermally treated at a temperature of 800° C. was added and used.

Comparative Examples 1 and 2

As shown in Table 1, in Comparative Examples 1 and 2, the small amount of ionomer dispersion solution was not added during the primary dispersion of the antioxidant, and secondary dispersion was performed for 120 min after primary dispersion. In Comparative Example 1, the SDC antioxidant (SDC-600) thermally treated at a temperature of 600° C. was added and used in the process of manufacturing the electrolyte membrane. In Comparative Example 2, the SDC antioxidant (SDC-800) thermally treated at 800° C. was added and used.

Evaluation Example 1: Analysis of Particle Agglomeration Size

Evaluation Method

The particle dispersivity was measured through analysis of particle agglomeration size of the dispersion liquid including the antioxidant in Examples and Comparative Examples. Particularly, particle agglomeration sizes were analyzed based on changes in antioxidant particle size distribution of Examples and Comparative Examples using a dynamic light-scattering particle size analyzer (Horiba, nano partica SZ-100). As the dispersivity of the SDC antioxidant was higher, the particle agglomeration size was decreased, and additionally, the rate of precipitation of antioxidant particles was observed to be low upon naked-eye inspection.

Evaluation Result

Figure 6:
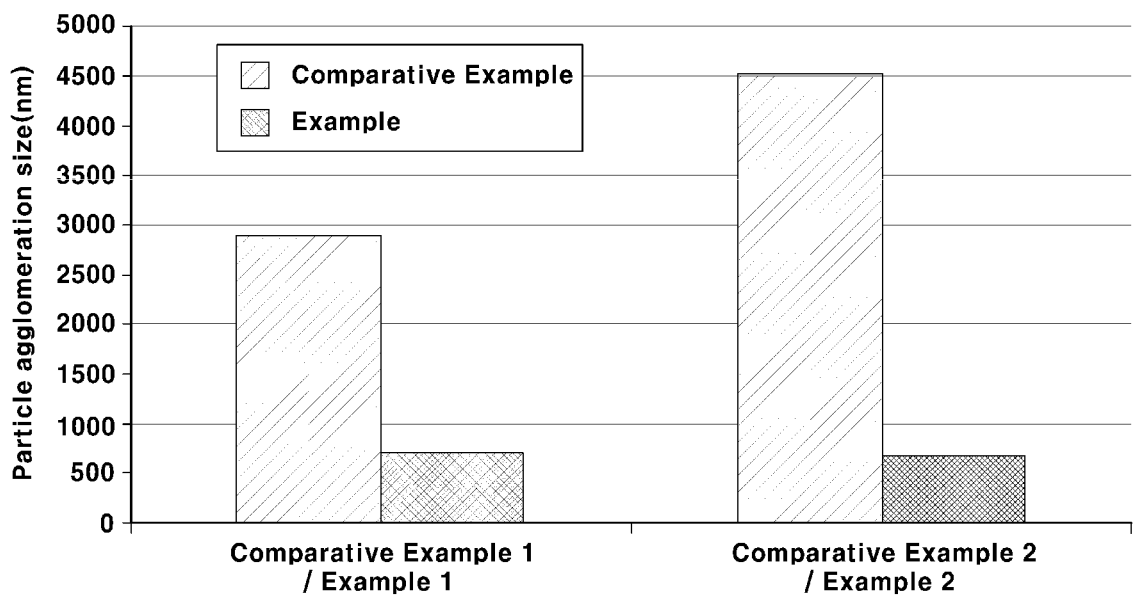
FIG. 6 is a graph showing the results of comparison of particle agglomeration sizes of the dispersion liquids in Examples 1 and 2 of the present invention and Comparative Examples 1 and 2.

FIG. 6 is a graph showing the results of comparison of particle agglomeration sizes of the dispersion liquids of Examples 1 and 2 and Comparative Examples 1 and 2.

With reference to FIG. 6, the particle agglomeration size of the SDC antioxidant in Examples 1 and 2, in which the antioxidant was thermally treated at a temperature of 600° C. (SDC-600) and 800° C. (SDC-800) and primary antioxidant dispersion was performed with the addition of the small amount of ionomer dispersion solution, was shown.

In contrast, the particle agglomeration size of the SDC antioxidant in Comparative Examples 1 and 2, in which the antioxidant was thermally treated at a temperature of 600° C. (SDC-600) and 800° C. (SDC-800) and primary antioxidant dispersion was performed without the addition of the small amount of ionomer dispersion solution, was shown. In particular, when comparing Comparative Example 1 and Comparative Example 2, the particle agglomeration size was greatly increased with an increase in the thermal treatment temperature.

As shown in FIG. 6, the particle agglomeration size was remarkably lower in Examples 1 and 2 than in Comparative Examples 1 and 2. On the other hand, particle agglomeration was very significant in Comparative Examples 1 and 2. This means that it is possible to increase the secondary dispersion time in order to sufficiently ensure the dispersivity of the antioxidant in the ionomer solution.

Evaluation Example 2: Acid Resistance Test Result

Evaluation Method

The antioxidant distributed in the electrolyte membrane was subjected to an acid resistance test using the electrolyte membrane including the antioxidant in Examples and Comparative Examples. Specifically, the electrolyte membrane prepared in each of Preparation Example and Comparative Preparation Example was cut to a predetermined size (5 cm×5 cm) and subjected to an acid resistance test in an acidic atmosphere simulating the actual operating conditions of a polymer electrolyte membrane fuel cell. More specifically, an SDC antioxidant was placed in 50 mL of a 0.5 M sulfuric acid ($H_2SO_4$) solution, maintained at a temperature of 80° C. for about 30 min, and washed with deionized water, after which cerium ion content remaining in the electrolyte membrane was measured using an X-ray photoelectron spectroscope. As the cerium ion content in the electrolyte membrane is increased, the acid resistance of the antioxidant may be higher. When the acid resistance is decreased, the SDC antioxidant may be dissolved in a large amount in the acidic ionomer dispersion solution and thus released to the sulfuric acid solution, whereby the remaining cerium ion content may be decreased.

Evaluation Result

Figure 7:
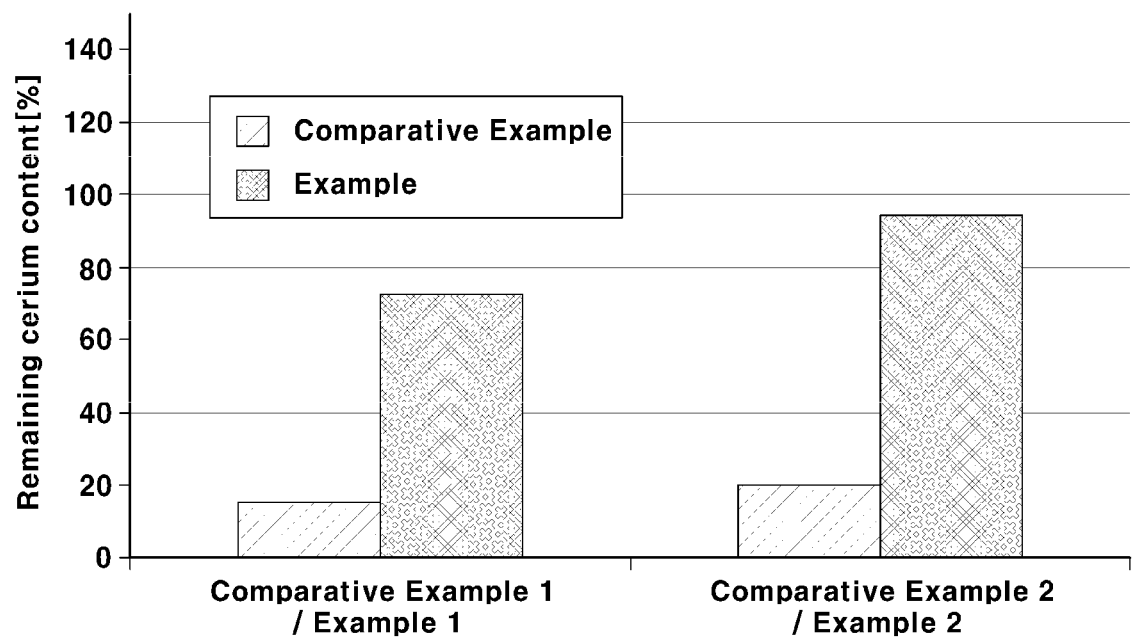
FIG. 7 is a graph showing the results of testing of acid resistance of Examples 1 and 2 of the present invention and Comparative Examples 1 and 2.

FIG. 7 is a graph showing the results of acid resistance testing of Examples 1 and 2 and Comparative Examples 1 and 2.

With reference to FIG. 7, the electrolyte membrane including the SDC antioxidant in Examples 1 and 2, in which the antioxidant was thermally treated at a temperature of 600° C. (SDC-600) and 800° C. (SDC-800) and primary antioxidant dispersion was performed with the addition of the small amount of ionomer dispersion solution, was maintained in a 0.5 M sulfuric acid ($H_2SO_4$) solution for 30 min, after which the remaining cerium content was about 72.8% and 94.5% relative to initial cerium content of 100%.

In contrast, the electrolyte membrane including the SDC antioxidant in Comparative Examples 1 and 2, in which the antioxidant was thermally treated at a temperature of 600° C. (SDC-600) and 800° C. (SDC-800) and primary antioxidant dispersion was performed without the addition of the small amount of ionomer dispersion solution, was maintained in a 0.5 M sulfuric acid ($H_2SO_4$) solution for 30 min, after which the remaining cerium content was about 15.3% and 20.0% relative to initial cerium content of 100%. This means that the antioxidant was dissolved (or released) in a very large amount in the acidic ionomer dispersion solution during the dispersion of the antioxidant that was added.

Therefore, as shown in the results of FIG. 7, upon primary dispersion of the antioxidant using the small amount of ionomer dispersion solution, the initial dispersivity of the antioxidant dispersion liquid may be maximized, whereby the dispersion time maybe minimized upon mixing with a large amount of ionomer dispersion solution. Ultimately, the acid resistance of the antioxidant in the final electrolyte membrane may significantly increase.

Although the various exemplary embodiments of the present invention have been disclosed for illustrative purposes, those skilled in the art will appreciate that various modifications are possible, without departing from the scope and spirit of the invention as disclosed in the accompanying claims, and such modifications should not be understood separately from the technical ideas or essential characteristics of the present invention.

What is claimed is:

1. A method of manufacturing an electrolyte membrane for a fuel cell, comprising:
    forming a first dispersion liquid comprising a first ionomer dispersion solution and an antioxidant; and
    forming a second dispersion liquid comprising the first dispersion liquid and a second ionomer dispersion solution,
    wherein a time for a second dispersing is less than a time for a first dispersing.
2. The method of claim 1, wherein the first dispersion liquid comprises deionized water.
3. The method of claim 2, wherein the forming the first dispersion liquid comprises a first dispersing the deionized water, the first ionomer dispersion solution and the antioxidant.
4. The method of claim 3, wherein the forming the first dispersion liquid comprises at least one of a stirring process using a magnetic bar or a sonication process.
5. The method of claim 4, wherein the first dispersing is performed for about 1 min to 60 min.
6. The method of claim 1, wherein the forming the second dispersion liquid comprises a second dispersing.
7. The method of claim 6, wherein the second dispersing is performed for about 1 min to 10 min.
8. The method of claim 6, wherein the second dispersing is performed through stirring after adding the first dispersion liquid to the second ionomer dispersion solution.
9. The method of claim 1, wherein a composition of the first ionomer dispersion solution is the same as a composition of the second ionomer dispersion solution.
10. The method of claim 9, wherein in the second dispersion liquid, a weight of the second ionomer dispersion solution is greater than a weight of the first ionomer dispersion solution.
11. The method of claim 9, wherein a mixing ratio of components in the composition of the first ionomer dispersion solution is the same as a mixing ratio of components in the composition of the second ionomer dispersion solution.
12. The method of claim 1, wherein a weight ratio of the first ionomer dispersion solution and the second ionomer dispersion solution in the second dispersion liquid is of about 1:5 to 1:5000.
13. The method of claim 1, wherein the antioxidant comprises one or more selected from the group consisting of cerium nitrate hexahydrate ($Ce(NO_3)_3 \cdot 6H_2O$), cerium oxide ($CeO_2$), and samarium-doped ceria (SDC).
14. The method of claim 1, wherein at least one of the first ionomer dispersion solution and the second ionomer dispersion solution comprises a solvent component comprising deionized water, n-propyl alcohol or combinations thereof.
15. The method of claim 1, wherein at least one of the first ionomer dispersion solution and the second ionomer dispersion solution comprises a perfluorinated sulfonic acid ionomer.
16. The method of claim 1, wherein an equivalent weight (EW) of at least one of the first ionomer dispersion solution and the second ionomer dispersion solution is of about 700 to 1200.
17. The method of claim 1, further comprising, after the forming the second dispersion liquid:
    manufacturing an electrolyte membrane by coating a release film with the second dispersion liquid; and
    thermally treating the electrolyte membrane.
18. An electrolyte membrane for a fuel cell, manufactured by the method of claim 1.

* * * * *